Figure 1:
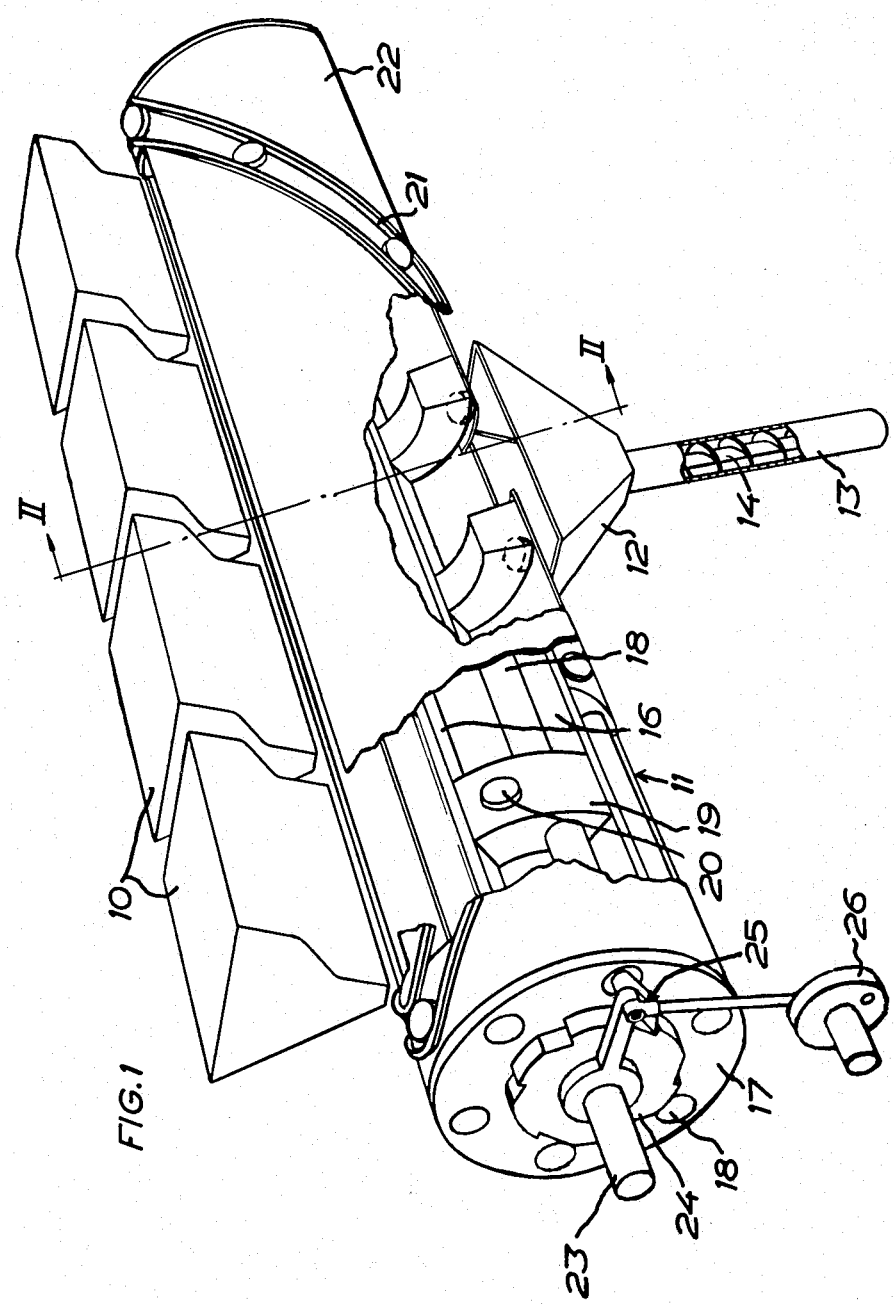

United States Patent [19]
Sollerud

[11] 3,913,791
[45] Oct. 21, 1975

[54] CONVEYING APPARATUS, ESPECIALLY FOR GRANULAR AND LUMP FORM MATERIAL

[75] Inventor: Soren Elof Mauritz Sollerud, Norrkoping, Sweden

[73] Assignee: Svenska Chokladfabriks Aktiebolaget, Ljungsbro, Sweden

[22] Filed: Feb. 19, 1974

[21] Appl. No.: 443,666

[52] U.S. Cl. ............................. 222/139; 222/145
[51] Int. Cl.[2] ........................................ B67D 5/56
[58] Field of Search .................. 141/100, 104, 296; 222/139, 368, 145

[56] References Cited
UNITED STATES PATENTS

| | | | |
|---|---|---|---|
| 857,742 | 6/1907 | Lanquist | 222/139 |
| 1,544,765 | 7/1925 | Lawrence | 222/139 |
| 2,193,373 | 3/1940 | Munro | 222/139 |

*Primary Examiner*—Houston S. Bell, Jr.

[57] ABSTRACT

Apparatus for receiving material from either one of a plurality of dosing units disposed in side-by-side relationship in either one of a plurality of identical compartments, and for conveying, within this compartment, the batch of material received to a given location therein which, after a predetermined movement of said compartment, lies above a collecting funnel or the like for receiving the batch of material.

7 Claims, 2 Drawing Figures

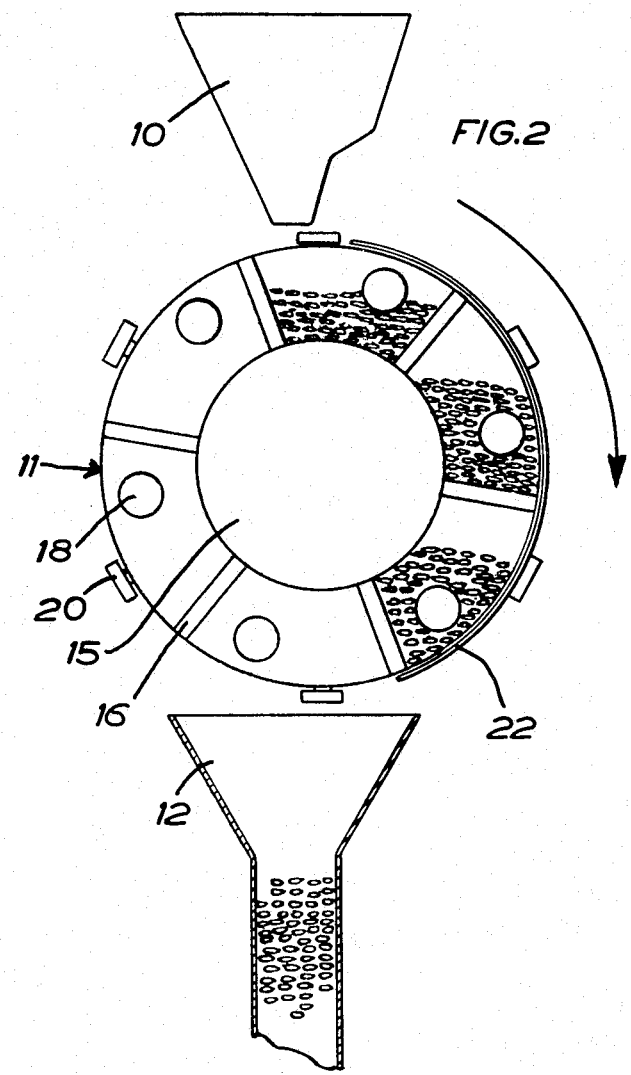

CONVEYING APPARATUS, ESPECIALLY FOR GRANULAR AND LUMP FORM MATERIAL

The present invention relates to an apparatus for conveying especially granular and lump form material from a plurality of dosing units to a receiving means, for instance in a bag-filling machine, said apparatus comprising means rotatable about its axis and adapted, in one rotary position, to receive material from said dosing units in compartments and, in another rotary position, to discharge the material into said receiving means, said compartments being closed between the positions of filling and discharging.

Packaging machines, such as bag-filling machines, often have a sealing rate exceeding the rate at which a dosing unit can supply the batch of material to be fed at a time. For this reason, one and the same packaging machine is provided with a plurality of dosing units, the batches from the dosing units being conveyed to the packaging machine in different ways, for instance by means of funnels, conveyer belts etc. These conveying methods suffer from the disadvantage that a dosing unit cannot discharge its batch of material before the batch discharged immediately before has been received by the packaging machine, and therefore directly affect the production rate of the packaging machine. In addition, it is not possible to convey fragile materials or products between the dosing units and the packaging machine by means of a collecting funnel, without the risk of damaging said material or products.

The object of the present invention is to provide an apparatus by which the batches from the dosing units can be rapidly but carefully supplied to the packaging machine so that the time cycles of the dosing units or the packaging machine are not prolonged by the conveying mechanism between the dosing units and the packaging machine, and the risk of damage or other undesirable effects on the material is eliminated. To this end, each compartment extends substantially along the entire length of the rotatable means and thus can always be positioned underneath all of the dosing units at once for receiving a batch of material from one of said units, conveying means being provided in each compartment for conveying the material in the compartment to a location therein which, after a predetermined rotary movement of said rotatable means, is above the receiving means so that the batch falls down into said receiving means when the compartment is opened.

The invention will be more fully described below, reference being had to the embodiment illustrated in the accompanying drawings in which:

FIG. 1 is a perspective view of an apparatus according to the invention, with certain parts broken away, and FIG. 2 is a sectional view along line II—II in FIG. 1.

In the drawing, 10 refers to four dosing units, for instance in the form of scales, the bottoms of which can be opened for discharging a batch of material from one or several machines for manufacturing or processing the material in question. Underneath the dosing units 10 there is provided a conveying means 11 by which the material from said dosing units is supplied to a receiving funnel 12 for further conveyance to a packaging machine via a conduit 13 and a conveyer screw 14 disposed therein.

The conveying means 11 comprises a cylindrical drum 15 having on its outer circumferential surface six radially projecting walls 16 extending over the entire length of the drum. The drum 15 has circular end walls 17 of a radius equalling the radius of the drum 15 plus the height of a wall 16 measured from the circumferential surface of the drum. The walls 16, the end walls 17 and the circumferential surface of the drum thus define six compartments around the drum. A shaft 18 extends along each compartment and, as can be seen in FIG. 2, is somewhat spaced apart from the centre thereof. The ends of these shafts are mounted in the end walls 17. On said shafts 18, two blocks 19 are movably mounted in each compartment, said blocks having the same cross-sectional form and size as the compartments, with the outwardly (i.e. away from the drum 15) facing boundary surface of the blocks 19 extending along a circular arc along the same radius as the end walls. The blocks 19 are movable back and forth in the compartments, and for effecting this movement each block has a dog 20 projecting from the outwardly facing boundary surface of the block and engaging a sliding path 21. Said sliding path 21 comprises two parts, one for each half of the drum, each said part comprising two portions, one of which may be compared to half a right-hand thread course with a steep pitch and the other to half a left-hand thread course with a steep pitch. Said two portions of either part of the sliding path merge into each other at the top and bottom of the drum, thereby making the path continuous. As will be described below in more detail, the drum 15 and its associated parts are rotatable, whereas the sliding path is stationary. Thus, it will be obvious that when the drum is rotating, the blocks 19 are caused to take part in the rotary movement, while at the same time they are moved back and forth in the longitudinal direction of the compartments. The apparatus is so devised that when a compartment is being filled, the blocks 19 are positioned at the very end of each compartment and, when the compartment is being emptied, they are positioned near the centre of the drum. As will appear from FIG. 2, a jacket 22 extends along the entire drum 15 through approximately 180° of the circumference thereof. The jacket 22 which, like the sliding path 21, is stationary and has a slot for said path, constitutes a lid for such compartments as have been filed (FIG. 2). At the centre of its lower edge, the jacket 22 has a recess above the receiving funnel 12 so as to make possible the discharge of material. A journal 23 is secured to the centre of either end wall, and on one of these journals there is provided a step wheel 24 engaged by a conventional stepping mechanism 25 with a driving wheel 26 for stepwise rotation of the drum 15 and its associated parts. The relative functions of the dosing units, the drum driving device and the packaging machine are, of course, controlled automatically.

The conveying apparatus described above operates as follows: The dosing units 10 receive material from one or several manufacturing or processing machines or from storage containers and can be so devised that the dosing unit first filled discharges its material into the underlying compartment. When a batch has been discharged into the compartment, the drum 15 is rotated one step, equalling 60°, by means of the mechanism 24, 25, 26, so that another empty compartment is brought into position underneath the dosing units 10. By this rotary movement, the blocks 19 are moved one step from the end positions which they occupy when a dosing unit 10 discharges its material, towards the centre of the drum 15. When the next compartment has been filled, the blocks 19 are moved a further step and, finally, when a further compartment has been filled, the last step to the end position adjacent the centre of the drum. It will be obvious that, depending on which dosing unit 10 has discharged its material into the compartment, either of the two blocks 19 has pushed said material along during one or more of these rotary movements so that, when the blocks are in the end position, the material is caused to fall down into the receiving funnel 12. After the filling of one more compartment and the subsequent turning of the drum through one step, the direction of movement of the blocks is reversed and said blocks are moved back into the position adjacent the ends of the drum.

I claim:

1. Apparatus for conveying individual dose of granular and lump form material from a plurality of dosing units to a receiving means such as a bag-filling machine, said apparatus comprising drum means having a plurality of compartments therein mounted for rotation about its axis and adapted, in one rotary position, to receive material from any of said dosing units in said compartments and, in another rotary position, to discharge the material from said compartments into said receiving means, means closing said compartments between the positions of filling and discharging, said compartments each extending substantially along the entire length of the rotatable drum means and thus can always be positioned underneath all of the dosing units at once for receiving a batch of material from one of said units, driven conveying means mounted in each compartment for conveying the material in the compartment to a location therein which, after a predetermined rotary movement of said rotatable means, is above the receiving means whereby the batch falls down into said receiving means when the compartment is opened.

2. Apparatus as claimed in claim 1, wherein said rotatable drum means comprises an elongated central support member rotatable about its longitudinal axis and having radially extending circumferential end walls and a number of longitudinal walls extending along the drum and radially projecting from the external surface thereof, said walls together with said external surface defining said compartments, and a stationary jacket extending in the longitudinal direction of the drum the full length of said chambers and in the circumferential direction approximately half way therearound, the surface of said walls facing away from the drum being in a position close to or in slidable contact with the inner surface of said jacket after a batch of material has been received and until said batch is discharged.

3. Apparatus as claimed in claim 2, wherein the conveying means of each compartment comprises at least one block having the same cross-sectional form and substantially the same cross-sectional dimension as the compartment and movable back and forth therein.

4. Apparatus as claimed in claim 3, wherein a stationary sliding path is provided for moving the block, said path being engaged by a projecting portion of the block for moving the block in the longitudinal direction of the drum during rotation thereof.

5. Apparatus as claimed in claim 4, wherein two blocks are provided in each compartment, said blocks being movable each between one end of the compartment and the centre thereof.

6. Apparatus as claimed in claim 1 further comprising stepping movement driving said drum means for intermittent rotation about its axis, said stepping movement including as many steps for each revolution as the number of compartments, said stepping means being adapted to automatically control the movement of the drum so that the drum is moved one step as soon as one of the dosing units has discharged its batch of material into a compartment.

7. Apparatus for conveying material from a plurality of dosing units to a receiving means in a bag-filling machine, said apparatus comprising drum means mounted for rotation about its longitudinal axis, a plurality of outwardly open compartments disposed in side by side relation around said drum means and extending longitudinally thereof means rotating said drum means about said axis to move said compartments successively passed a material receiving station extending beneath all of said dosing units and a discharge station extending above a material receiving means, means closing said compartments during rotation thereof from said material receiving station to said discharge station, and a material conveying means in each said compartment operable to convey material in the compartment to a predetermined location therein during movement thereof from said receiving station to said discharge station.

* * * * *